(12) United States Patent
Johansen et al.

(10) Patent No.: US 11,388,861 B2
(45) Date of Patent: Jul. 19, 2022

(54) SYSTEM FOR CLIMATE CONTROL IN CLOSED OR SEMI CLOSED SPACES

(71) Applicant: GREENCAP SOLUTIONS AS, Larvik (NO)

(72) Inventors: Tom Johansen, Larvik (NO); Tor Christensen, Sandefjord (NO); Jarle Skjaeveland, Hafrsfjord (NO)

(73) Assignee: GREENCAP SOLUTIONS AS, Larvik (NO)

( * ) Notice: Subject to any disclaimer, the term of this patent is extended or adjusted under 35 U.S.C. 154(b) by 471 days.

(21) Appl. No.: 16/325,886

(22) PCT Filed: Aug. 16, 2017

(86) PCT No.: PCT/NO2017/050204
§ 371 (c)(1),
(2) Date: Feb. 15, 2019

(87) PCT Pub. No.: WO2018/034570
PCT Pub. Date: Feb. 22, 2018

(65) Prior Publication Data
US 2019/0208714 A1    Jul. 11, 2019

(30) Foreign Application Priority Data
Aug. 16, 2016  (NO) .................................. 20161306

(51) Int. Cl.
*B01D 53/02*   (2006.01)
*A01G 9/24*    (2006.01)
(Continued)

(52) U.S. Cl.
CPC ............... *A01G 9/246* (2013.01); *A01G 9/18* (2013.01); *B01D 46/0036* (2013.01);
(Continued)

(58) Field of Classification Search
CPC .... A01G 9/18; A01G 9/246; B01D 2253/108; B01D 2253/20; B01D 2257/504;
(Continued)

(56) References Cited

U.S. PATENT DOCUMENTS

2005/0199124 A1    9/2005  Little et al.
2011/0203174 A1    8/2011  Lackner
(Continued)

FOREIGN PATENT DOCUMENTS

CN    204933232 U    1/2016
EP    0904823 A2     3/1999
(Continued)

OTHER PUBLICATIONS

International Preliminary Report on Patentability in PCT International Application No. PCT/NO2017/050204 dated Jul. 17, 2018.
(Continued)

*Primary Examiner* — Christopher P Jones
(74) *Attorney, Agent, or Firm* — Greenberg Traurig, LLP; David J. Dykeman; Todd C. Basile

(57) ABSTRACT

A system and method for enhancement of $CO_2$ concentration in closed or semi closed spaces, wherein said system comprises a unit (3) for capturing $CO_2$ from ambient air, said unit further comprises two process units (134, 172) capable of 5 adsorbing and desorbing $CO_2$ on an adsorbent, and working alternately in adsorbing and desorbing mode.

5 Claims, 6 Drawing Sheets

(51) Int. Cl.
*A01G 9/18* (2006.01)
*B01D 46/00* (2022.01)
*B01D 53/04* (2006.01)

(52) U.S. Cl.
CPC ........ *B01D 53/04* (2013.01); *B01D 2253/108* (2013.01); *B01D 2253/20* (2013.01); *B01D 2257/504* (2013.01); *B01D 2259/4508* (2013.01); *B01D 2279/50* (2013.01); *Y02A 40/25* (2018.01); *Y02B 30/52* (2013.01); *Y02P 60/20* (2015.11)

(58) Field of Classification Search
CPC ........ B01D 2259/4508; B01D 46/0036; B01D 53/04; Y02A 40/25; Y02P 60/14; Y02P 60/20
See application file for complete search history.

(56) References Cited

U.S. PATENT DOCUMENTS

| | | | |
|---|---|---|---|
| 2015/0282440 A1 | 10/2015 | Shelor | |
| 2015/0298043 A1* | 10/2015 | Meirav | B01D 53/04 95/11 |
| 2016/0157438 A1 | 6/2016 | Brem et al. | |
| 2016/0166978 A1* | 6/2016 | Tai | B01D 53/0462 95/26 |
| 2017/0182865 A1* | 6/2017 | Miyakoshi | F25B 40/00 |
| 2017/0203249 A1* | 7/2017 | Gebald | B01D 53/0438 |
| 2018/0147526 A1* | 5/2018 | Meirav | F24F 11/30 |

FOREIGN PATENT DOCUMENTS

| | | |
|---|---|---|
| EP | 1908809 A1 | 4/2008 |
| EP | 2465596 A1 | 6/2012 |
| JP | 2011094821 A | 5/2011 |
| JP | 2012016322 A | 1/2012 |
| JP | 2016131920 A | 7/2016 |
| TW | 201115083 A | 5/2011 |
| WO | 2004101113 A1 | 11/2004 |
| WO | 2009105566 A2 | 8/2009 |
| WO | 2011004596 A1 | 1/2011 |
| WO | 2013075981 A2 | 5/2013 |
| WO | 2015190213 A1 | 12/2015 |

OTHER PUBLICATIONS

International Search Report in PCT International Application No. PCT/NC2017/050204 dated Dec. 1, 2017.
Norwegian Search Report in Norwegian Application No. 20161306 dated Mar. 14, 2017.

* cited by examiner

Figure 2

SYSTEM FOR CLIMATE CONTROL IN CLOSED OR SEMI CLOSED SPACES

CROSS-REFERENCE AND CLAIM OF PRIORITY TO RELATED APPLICATIONS

This application is a U.S. national phase application of PCT International Patent Application No. PCT/NO2017/050204, filed on Aug. 16, 2017, which claims the benefit of and priority to Norwegian patent application no. 20161306, filed Aug. 16, 2016, each of which are hereby incorporated by reference in their entireties.

TECHNICAL FIELD

The present invention relates to a method for the enhancement of $CO_2$ concentration in closed spaces, such as greenhouses, combined with air conditioning, enabling the increased rate of $CO_2$ uptake by plants and faster plant growth rates while avoiding plant issues associated with too high or too low air relative humidity. More specifically, the present invention relates to the integration of a clean method and process for $CO_2$ capture from air combined with high energy efficiency wet bulb temperature control and dry bulb temperature control, without any use of oxygen degradable chemicals, with high efficiency $CO_2$ capture, with overall net energy savings, and which is carbon negative from a general system point of view.

BACKGROUND ART

Plants growing in closed or confined areas such as greenhouses will absorb $CO_2$ and deplete the $CO_2$ in the surrounding air. This reduces the concentration of $CO_2$ and hampers plant growth rate. The depletion may happen very quickly, within hours even if there is some air leakage from the surroundings into the closed or semi-closed space. While the concentration of $CO_2$ in the atmosphere is about 400 ppm on a volume basis, the concentration of $CO_2$ in a well ventilated, semi-closed space may typically be in the range 300-330 ppm. This assumes high ventilation rates, enough to completely change all the air in the semi-closed space once or twice an hour. Values of $CO_2$ concentrations well below 300-330 ppm, such as closer to 200 ppm may occur if ventilation is inadequate. This may virtually stop plant growth. If there is a temperature difference between the semi-closed space and the surrounding air, the required ventilation air must be heated. This can be very energy intensive.

Regardless of ventilation rates, it is not possible to increase the $CO_2$ concentration in a semi-closed space to the same concentration as the ventilation air, without $CO_2$ enrichment. It is however well known that $CO_2$ enriched air, to the point where the $CO_2$ concentration in the semi-closed system reaches 400 ppm and up to more than 1000 ppm can significantly enhance plant growth and biomass production rate, by for example 20-80% or more.

Plant transpiration in closed or semi-closed spaces increases the relative humidity in the local air. About 90% of the humidity taken up by plants is used for transpiration while 10% is used for growth. The transpiration cools the plant to 2° C. or more below the ambient temperature. The rate of transpiration is a function of, among other factors, the radiative heat input and the air relative humidity. High relative humidity, near water vapour saturation in the local air, reduces transpiration. If the temperature then drops, water may precipitate on plant leaves and elsewhere. This increases the risk of fungal diseases. Low relative humidity, such as below 50% in combination with high temperature, may result in excessive transpiration rates. The plant may then start to close the stomata openings, through which transpiration occurs, to reduce transpiration. However, $CO_2$ uptake also occurs through the stomata openings, so this may restrict plant growth. It is important to maintain the local air relative humidity at acceptable if not optimum levels.

Plant growth rate depends on the local air temperature. The optimum temperature depends on plant species and time of day. Day temperature of 20-25° C. is suitable for most plants. Optimum night temperatures may be in the range from 10-18° C. In many areas with extensive use of closed or semi-closed system biomass production heating is required year-round.

Although highly interdependent, the three important controllable operational parameters, $CO_2$ concentration, relative humidity and temperature are often managed more or less independently. FIG. 3 shows an example effect of $CO_2$ on growth rate, assuming that other nutrients and light are adjusted to appropriate levels. In the example, normal or 100% growth rate is set at $CO_2$ concentration level 320 ppm on volume basis. If furthermore the example the $CO_2$ consumption is corresponding to 100 ppm $CO_2$ per hour, or about 900 g $CO_2$ per 5000 $m^3$ volume and hour. The optimum growth rate, at least for some plants, is reached when the $CO_2$ concentration is about 1000 ppm. If venting is required, the air from the closed system will also contain 1000 ppm $CO_2$ and therefore be a source of $CO_2$ emission.

$CO_2$ may be supplied by ventilation. However, this cannot elevate the $CO_2$ concentration to above the $CO_2$ concentration in the atmosphere, about 400 ppm. The maintenance of $CO_2$ concentrations much above 320 ppm requires high ventilation rates. In cold climates, the associated energy needed for ventilation air heating can be substantial. In very warm climates the cooling of ventilation air may be desirable. Humidity may then have to be removed from the air to minimize the formation of water condensate. Ventilation causes the loss of water vapour formed by transpiration, or 90% of the irrigation water.

For enhanced $CO_2$ concentrations $CO_2$ must normally be supplied from sources other than air. Examples are $CO_2$ supply from the burning of fossil fuels, which also generates heat, $CO_2$ supplied from compressed, bottled $CO_2$, $CO_2$ supply from dry ice, from decomposition of organic matter or from fermentation. If the greenhouse is ventilated, and the $CO_2$ concentration is maintained above 400 ppm, all of this results in net $CO_2$ emission to the atmosphere which is undesirable.

WO 2013075981 describes a method for extracting $CO_2$ from air by adsorption and desorption on a solid adsorbent. The solid sorbent is functionalized using amine compounds. This enhances the adsorption capacity and reduces adsorbent sensitivity to humidity. However, during regeneration of the adsorbent, the amine compounds are exposed to hot air with high concentrations of oxygen, causing potential degradation to toxic and possibly cancerous products. $CO_2$ from such sources can therefore not be used in the enclosed space of a greenhouse.

Relative humidity in greenhouses may be controlled by ventilation with air. However, this may affect the $CO_2$ concentration in the greenhouse negatively, in particular if enhanced $CO_2$ levels are employed. Furthermore, the energy needed for ventilation air heating can be substantial. In warm and humid climates, reduction of humidity by ventilation may not work well. Similar to ventilation to supply $CO_2$, any ventilation to reduce the amount of water vapour in the air causes the loss of water vapour from transpiration, or about 90% of the irrigation water.

An alternative way to reduce the water vapour content in the air inside a greenhouse is to spray the air with chilled water. The chilling may be accomplished by circulating the water between the in-house spray and an outside contact with air. Some of the water in contact with air will evaporate, assuming the outside air is not saturated or nearly saturated with water vapour. This cools the water which can then be re-circulated for cooling inside the greenhouse using water spray. However, similar to moisture removal by ventilation, this results in the loss of potentially valuable water. Unfortunately, spraying with chilled water does not reduce the relative humidity in the air. Regardless of cooling and water vapour removal from the air, the air will remain saturated with water vapour which can be harmful to plants.

A better way to control greenhouse relative humidity, or water vapour content relative to water vapour content under saturated conditions, is a combination of ventilation and heating. Heating increases the water vapour content of the air in saturated conditions, without adding water vapour to the air, and therefore the relative humidity decreases. However, this may not work well in very warm areas where air heating is undesirable.

Heating of greenhouse air may be accomplished by electric heating or by heat from the burning of fossil fuels. The latter will affect both $CO_2$ content and, to a lesser extent, water vapour content in the greenhouse air.

Globally, food supply challenges are increasing. World population is expected to increase from about 7 billion in 2012 to above 9 billion by 2050. Food supply must increase correspondingly without further harmful effects on the environment. This is required in a situation where global warming reduces crop yield especially in warm areas where most of the population increase occurs and where water stress in many of the same areas is high because of increased water use. Solutions include shift in diet to more plant based products, reduction in $CO_2$ emissions, reduced use water and reduced use of fossil fuels.

The object of the present invention is to provide a method and a plant where greenhouse $CO_2$ level, relative humidity and temperature can be controlled independently with minimum or zero $CO_2$ emissions, with water conservation and with efficient use of energy for heating. A further object is to provide $CO_2$ or enhanced levels of $CO_2$ locally from air without any possibilities for harmful amine degradation products, and to ensure that virtually all of this $CO_2$ is used by plants rather than being re-emitted to the air by venting.

WO 2009/105566 A2 regards an alternative option for capturing $CO_2$ at elevated levels of $CO_2$ include the use of activated carbon, the use of zeolites, the use of weak based amine, or other sorbents such as activated alumina for $CO_2$ capture instead of ion exchange resin.

However, at non-elevated levels of CO2 there is a significant challenge because physical adsorbents are poisoned by H2O and hence reduces the capacity for CO2 capture, a problem not mentioned in WO 2009/105566 A2.

SUMMARY OF INVENTION

The object of the present invention, as stated in the set of claims, is to solve the problems mentioned above.

The present invention regards a system and a method for enhancement of $CO_2$ concentration in closed or semi closed spaces, wherein said system comprises a unit for capturing $CO_2$ from ambient air, said unit further comprises two process units capable of adsorbing and desorbing $CO_2$ on an adsorbent, and working alternately in adsorbing and desorbing mode.

BRIEF DESCRIPTION OF DRAWINGS

FIG. 2 shows details of $CO_2$ adsorption units

DETAILED DESCRIPTION OF THE INVENTION

In the present description and claims the terms "humidity" and "absolute humidity" are used as a measure of the true water vapour content of air ($g/m^3$). The term "relative humidity" of an air-water vapour mixture is used as a measure of the ratio of the actual partial pressure of water vapour in the air to the partial pressure of water vapour in the air if the air had been saturated at the temperature in question. The term "$CO_2$ concentration" is a measure of the number of moles of $CO_2$ in the air relative to the total number of gas molecules in the air. It is measured in ppm or parts per million.

The pressure is herein given in the unit "bara" is "bar absolute". Accordingly, 1,013 bara is the normal atmospheric pressure at sea level. In SI units, 1 bar corresponds to 100 kPa.

The expression "ambient temperature" as used herein may differ with the climate for operation closed or semi-closed system served by a process according to the present invention. Normally, the ambient temperature is from about 0 to 40° C., but the ambient temperature may also be from sub-zero levels to somewhat higher than 40° C., such as 50° C.

The term "solar radiation" or "insolation" as used herein refers to the energy received from the sun at sea level. It is measured in $W/m^2$. Areas representing most of the world's population have insolation levels of 150-300 $W/m^2$.

Figure 1:
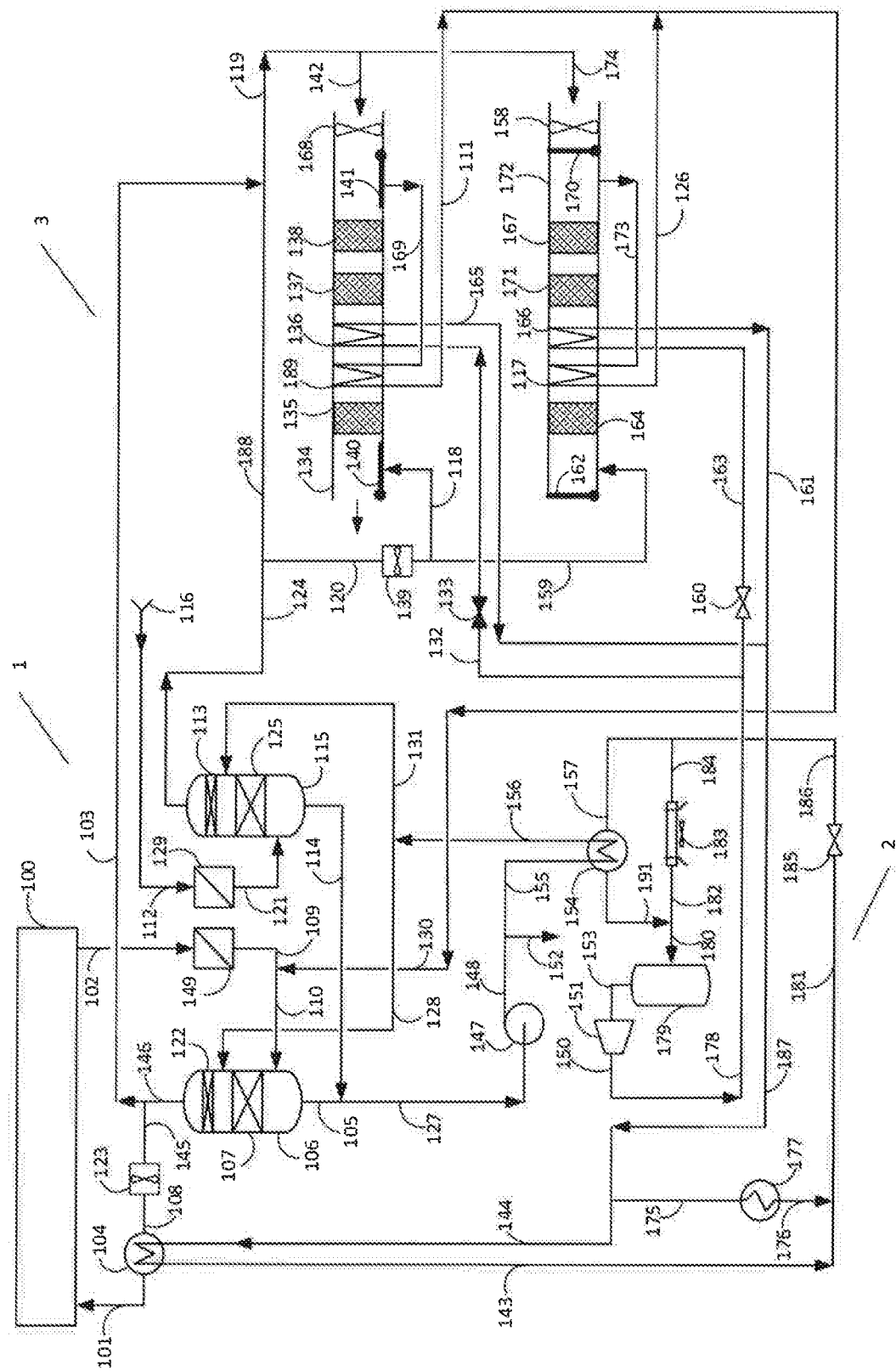
FIG. 1 is a schematic diagram showing greenhouse $CO_2$ supply and relative humidity and temperature control in an embodiment of the invention.

FIG. 1 is a principle overall sketch of a system according to a preferred embodiment of the present invention. Part 1 is a process for air filtering, cooling and de-humidification and heating, comprising two columns. One is for treatment of circulation air and ventilation air in a closed or semi-closed system such as a greenhouse. The other is for filtering, cooling and de-humidification of air from the surroundings. Part 2 is a heat pump. Part 3 is a system for adsorption of $CO_2$ from the ambient air and from greenhouse ventilation air, using only solid zeolite materials without any chemicals.

Part 1, air filtering, cooling and de-humidification and heating, shows a closed or semi-closed system for plant growth 100 and an air purification and $CO_2$ enrichment system comprising a filter 149, a conduit for the supply of $CO_2$ enriched air 130, a cooling and de-humidification column 106, a fan 123 and a heater 104. Air flows from the unit 100 via a conduit 102 to the filter 149. It exits the filter 149 in a conduit 109 and is mixed with $CO_2$ rich air from part 3 of the process, supplied via the conduit 130. The $CO_2$ rich air contains between 500 and 5000 ppm $CO_2$, such as 1900 ppm $CO_2$. The mixture of circulation air and $CO_2$ rich air is directed via a conduit 110 to the column 106. In the column 106, the air flows upwards counter-current to chilled water over a packing 107, providing good contact between the air and the water. The chilled water is supplied in a conduit 128. After contact in the packing 107, the chilled air flows through a demister 122 to remove entrained water droplets. The chilled air exits the column 106 in a conduit 146. The flow is split in two, a smaller flow that is directed to part 3 of the process via a conduit 103, removing air displaced by air from the conduit 130 which will be described further below, and a larger flow that is directed to a fan 123 via a conduit 145. After a pressure boost in the fan 123, the air is heated in the heater 104 and recycled to the closed or semi-closed plant growth unit via a conduit 101.

Chilled water and water recovered from the air by condensation in the column 106 is collected in the bottom of the column and discharged from the system via a conduit 105. After mixing with water from a column 115, supplied via a conduit 114, the combined water flow is directed to a pump 147 via a conduit 127. The water is discharged from the pump 147 in a conduit 148. Surplus water is discharged from the system in a conduit 152. The remaining water is routed to a cooler 154 via a conduit 155, then via a conduit 156 to a split into a conduit 131 and the conduit 128. People skilled in the art will know that air from the column 106 is saturated or nearly saturated with water vapour, and that the temperature of this air therefore determines the absolute humidity. They will also know that the absolute humidity and the temperature downstream of the heater 104 will determine the air relative humidity. Furthermore, the air flow rate and $CO_2$ concentration in the conduit 130 will determine the $CO_2$ concentration in the air flows from the column 106 in the conduit 146. Control is possible such that desired relative humidity, temperature and $CO_2$ levels are achieved in the unit 100, as represented by measurements in the exit air flow from the unit 100, in the conduit 102.

Part 1, air inlet and pre-treatment show an air inlet 116 feeding air to a filter 129 via a conduit 112. After filtering, the air is chilled and de-humidified in a column 115 by counter-current flow against chilled water in a packing 125. A demister 113 removes entrained water droplets from the air prior to air discharge and flow via a conduit 124 to part 3 of the process, which will be discussed below. Circulation water and condensate is discharged from the column 115 in the conduit 114. It is directed to the conduit 105 and mixed with water in this conduit. Similar to the water from the column 106 it is then directed to the water cooling loop comprising the conduit 127, the pump 147, and the conduit 148. Surplus water is discharged via the side draw 152. The remaining water flow is cooled in cooler 154, and then directed back to the column 115 via the conduits 156 and 131.

Part 2 shows a heat pump which uses heat from the air cooling and water vapour condensation in part 1, optionally with some heat from the surroundings, pumps it to a higher temperature level, and uses the resulting higher temperature heat to heat air for return to the closed or semi-closed plant growth system 100. There are two main flow loops. One, that was also discussed above, is a water flow loop supplied with water from the columns 106 and 115. This water flows via the conduit 127, the pump 147 and the conduits 148 and 155 to the water cooler 154. Here, the water temperature is reduced to between 0 and 5° C., such as 1° C. and directed via the conduits 156, 128 and 131 to the columns 106 and 115, respectively. The water flow rates in the conduits 128 and 131 are adjusted such that the resulting air temperatures, above the packings 107 and 125 reach desired levels.

The second flow loop in part 2 is a refrigerant, such as ammonia or Freon cooling cycle. High pressure refrigerant, at pressure for example between 15 and 30 bara, such as 20 bara depending on the refrigerant properties, flows from a compressor 151 via a conduit 150 to a side draw in a conduit 178. The conduit 178 directs the refrigerant as high temperature heating medium to part 3 of the process, where mainly sensible heat is utilized. After utilization of some of the available sensible heat, such as for example 15%, the still gaseous refrigerant is returned from part 3 of the process in a conduit 187. This flow is split in two, one part in a conduit 144 to an air heater 104 where the refrigerant is cooled and condensed, and returned in a conduit 143. The rest of the refrigerant is directed via a conduit 175 to a cooler 177, where it is cooled and condensed and then mixed with the refrigerant in the conduit 143 via a conduit 176. The total amount of condensed refrigerant is directed in a conduit 181 to a valve 185. In this valve the pressure is reduced to for example between 2 and 5 bara such as 2.8 bara. This reduces the temperature of the refrigerant to, depending on refrigerant properties, between −5 and −20° C. such as −10° C. The cold fluid is directed via a conduit 186 to a side draw conduit 184 where some of the fluid is directed to a heater 183, conveniently using heat from the ambient air, if the heat from the heat exchanger 154 is insufficient. The rest of the fluid is directed via a conduit 157 to the heat exchanger 154, where it is heated and vaporized by heat exchange with water from the conduit 155. The resulting warmed and vaporized refrigerant, from the heater 183 via conduit 182 and from the heat exchanger 154 via a conduit 191, are mixed and directed via a conduit 180 to a liquid knock-out drum 179 before being led to the compressor 151 via a conduit 153, closing the refrigerant flow loop.

Part 3 of the process is $CO_2$ capture from air, which contains about 400 ppm $CO_2$, and delivery of this $CO_2$ in a more concentrated form, for example between 750 and 4500 ppm, such as 1400 ppm, to the plant growth unit 100. Part 3 comprises two main and identical process units 134 and 172, both capable of adsorbing and desorbing $CO_2$ on an adsorbent, and they work alternately in adsorbing and desorbing mode. The solid adsorbent is zeolite, a microporous crystalline alumina-silicate that contains no additional chemicals and is therefore inert and completely safe. It is stable up to temperatures above 700° C. and commonly used as dessicant and $CO_2$ adsorbent. When used as $CO_2$ adsorbent water is preferentially adsorbed and the $CO_2$ adsorbent must therefore be kept dry.

Air is supplied via the air intake 116 and directed via the filter 129, the column 115 and the conduit 124 which branches into to a conduit 188 leading to the unit 134 that is in $CO_2$ adsorption mode, and a conduit 120 leading to the unit 172 that is in $CO_2$ desorption mode.

Air in the conduit 120 flows via a fan 139 and a conduit 159 to the unit 172 for $CO_2$ desorption. The unit 172 $CO_2$ has a valve 162 and a valve 170 shown in positions where only air from the conduit 159 can enter the unit, and $CO_2$ rich air can only exit through a conduit 173. There is no air flow to the unit via an inlet air conduit 174, or a fan 158. Air from the conduit 159 is dehydrated to very low residual water levels in a zeolite section 164. Dried air is heated by heat exchange with exit air from the unit in a heat exchanger 117 and subsequently in a trim heater 166.

The trim heater employs refrigerant from part 2 of the process as heating medium, supplied via the conduit 178, a valve 160 that is open and a conduit 163. The condensed and/or and cooled refrigerant is returned from the heat exchanger 166 via conduit ac161 and the conduit 187 to the conduit 175 in part 2 of the process. From the heat exchanger 166, the air, now heated from below 10° C. to a temperature for example in the range 50 to 70° C., flows to a zeolite section 171 where $CO_2$ is desorbed. Desorption occurs by the combined action of low $CO_2$ concentration in the incoming air, creating a driving force for $CO_2$ flow from the adsorbent to the air, and elevated temperature, which reduces the adsorbent ability to hold $CO_2$. After $CO_2$ enrichment in the zeolite section 171, the dry and $CO_2$ rich air flows to a zeolite section 167 where adsorbed water is desorbed. The hot and dry air creates a driving force for water flow from the zeolite to the air and increases the zeolite temperature, thereby reducing the zeolite ability to hold water. The $CO_2$ rich air exits the unit 172 in the conduit 173, flows via the heat exchanger 117, a conduit 126 and the conduit 130 to part 1 of the process.

Air in the conduit 188 is mixed with air from the conduit 103 and directed via a conduit 119 and a conduit 142 to the unit 134. This unit is in $CO_2$ adsorption mode. Connections for desorbing, including air inlet via a conduit 118 and air outlet via a conduit 169, a heat exchanger 189 and a conduit 111 are closed by the doors 140 and 141. Compressed refrigerant for trim heating, from a conduit 132 via a valve 133 to a heater 136 and return via a conduit 165 is also closed. Air from the conduit 142 flows via a fan 168, and via the open door 141 to an adsorbing section 138 where water is adsorbed. The dry, cold air from the section 138 flows to a new section 137 where $CO_2$ is adsorbed. The air, depleted in $CO_2$, then flows via the heater 136 and the heat exchanger 189 to a section 135. In this section water is being desorbed using the driving force created by the high moisture content in this section and the low moisture content of the air. Possibilities exist to do some heating using the heater 136, assisting this desorption process by reducing the ability of the adsorbent in the section 135 to hold water. After $CO_2$ adsorption, the air from the unit 134 is directed to the surroundings.

Figure 2:
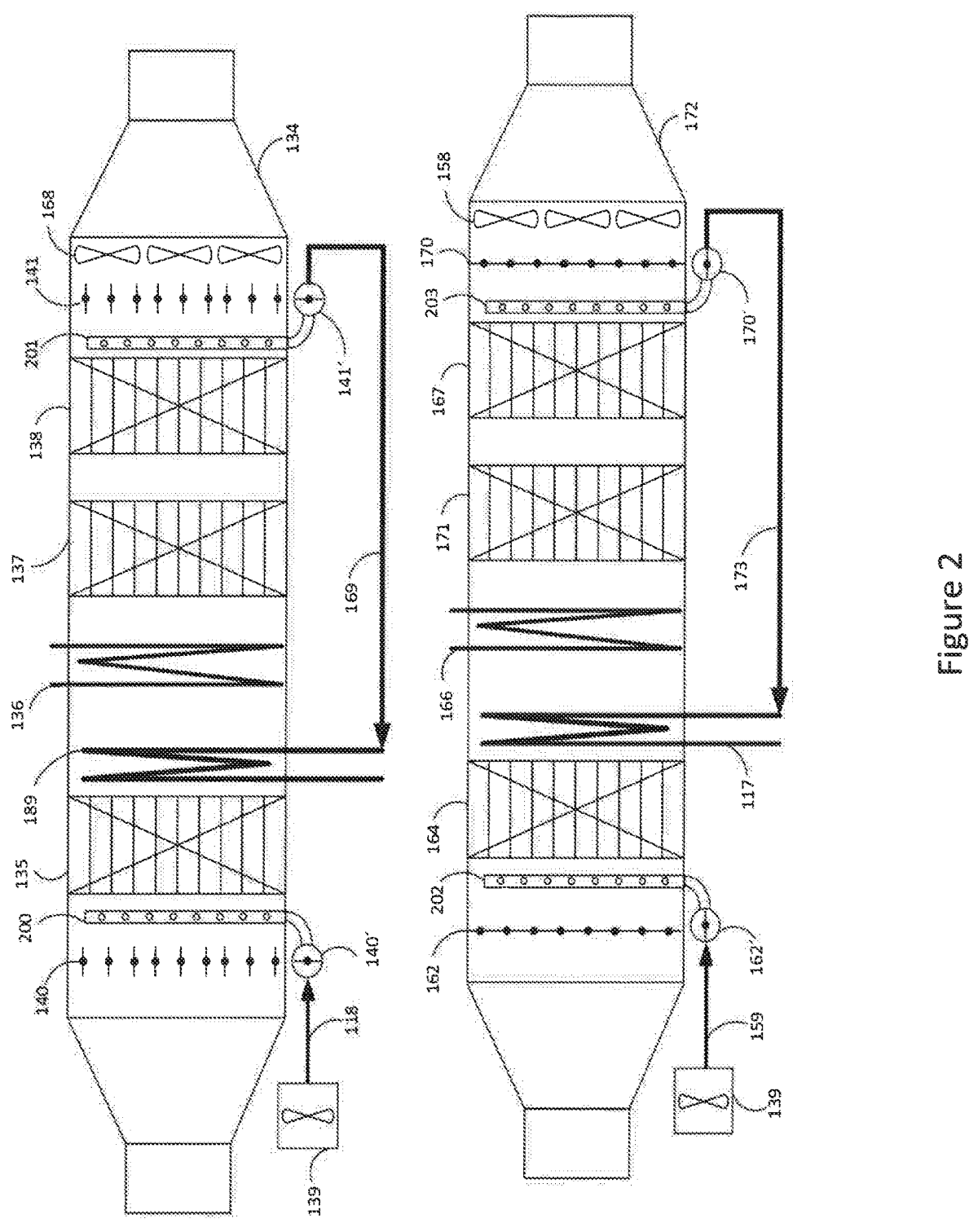

FIG. 2 shows preferred embodiments of the adsorption systems 134, in $CO_2$ adsorption mode, and 172, in $CO_2$ desorption mode. The numerals are the same as for the same units in FIG. 1. The doors 140 and 141 are open. Instead of directly closing the conduits 118 and 169, this is done with two separate valves 140' and 141' respectively, shown as closed in FIG. 2. The doors 162 and 170 are closed. Instead of directly opening to the conduits 159 and 173, this is done with two separate valves 162' and 170' respectively, shown as open in FIG. 2.

The zeolite in the sections 135, 137 and 138 in the unit 134 is divided into horizontal sections to improve the air flow in the zeolite. Similarly, zeolite in the sections 164, 171 and 167 in the unit 172 is divided into horizontal sections. Manifolds 200 and 201 further improve the distribution and flow of air in the unit 134, while manifolds 202 and 203 improve the distribution and flow of air in the unit 172.

Example

Figure 3:
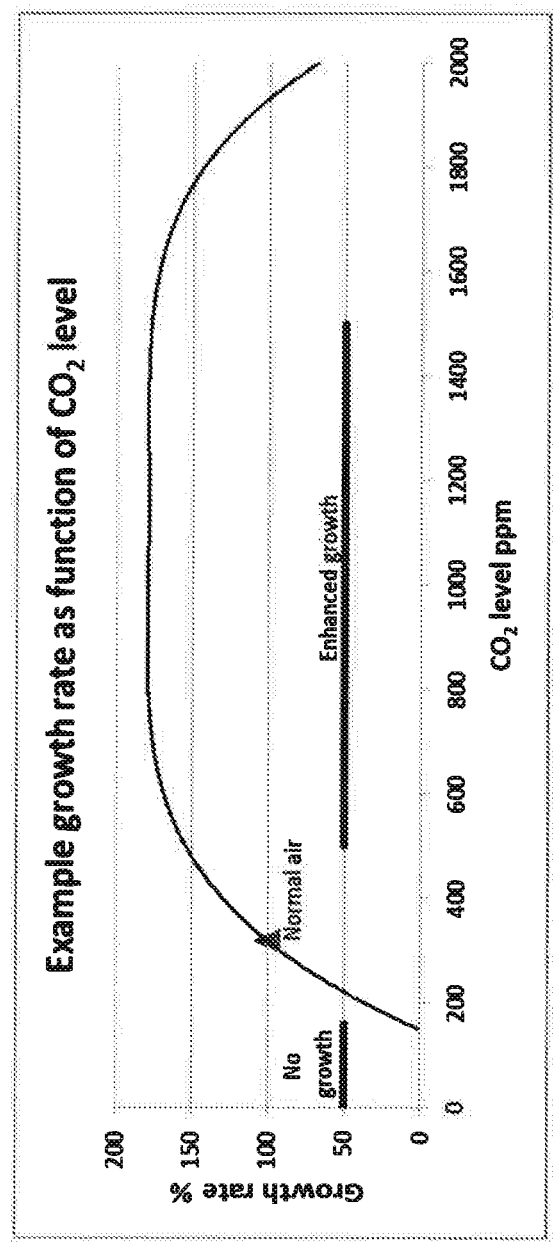
FIG. 3 shows an example of growth rate as function of $CO_2$ level.

A greenhouse with floor area 1000 $m^2$ and volume 5000 $m^3$ receives solar radiation of 150 $W/m^2$. The CO2 concentration shall be maintained at 850 ppm, the temperature at 25° C. and the relative humidity at 75%. The ambient temperature is 15° C. and the ambient air has relative humidity 80%. The $CO_2$ consumption of plants within the greenhouse is about 1.6 kg/h, based on a reference $CO_2$ consumption of 100 ppm or about 0.9 kg/h when the $CO_2$ concentration is 320 ppm. This is shown as a triangle called "normal air" in FIG. 3. With 850 ppm $CO_2$ in the greenhouse air, the example growth rate is about 1.8 times higher, corresponding to $CO_2$ consumption of about 1.6 kg/h.

The net heat loss from the greenhouse, solar irradiation when reflection (albedo), infrared radiation, energy consumed by photosynthesis and plant transpiration, and energy loss to the surroundings by heat transfer to the colder ambient air, is about 46 kW. Plant transpiration rate is about 74 kg/h.

The process in FIG. 1 is employed. Air flow from the greenhouse in the conduit 102 is 7600 $m^3/h$ or about 10000 kg/h. This provides air residence time, or greenhouse volume relative to volumetric air flow through the greenhouse, of about 40 minutes. At steady state operation this air is at 25° C. and 75% relative humidity. The $CO_2$ concentration is about 850 ppm. This air is mixed with 1080 $m^3/h$ air containing about 1900 ppm $CO_2$ from the conduit 130. This mixture is cooled to about 7° C. by counter-current contact with water in the packing 107. This cooling removes about 75 kg/h water from the air, and the air absolute humidity or moisture content downstream the demister 122, in the conduit 146, is about 8 $g/m^3$. An air side draw from the conduit 146 of about 1080 kg/h or 10% on molar basis is directed via the conduit 103 for $CO^2$ recovery. The remaining air is heated to about 44° C. in the heater 104 and recycled to the greenhouse via the conduit 101.

The cooling water flow to the column 106, via the conduit 128, is about 5500 kg/h at 1° C. This water is heated to about 18° C. in the packing 107 and flows together with about 4500 kg/h water at 6° C. from the column 115, the conduit 114, via the conduit 127, the pump 147 and the conduit 148 to a side draw 152. The temperature at this point is about 13° C. Surplus water or condensate, about 90 kg/h, 71 kg/h from the column 106 and 19 kg/h from the column 115, is discharged via the conduit 152. The remaining water, about 10000 kg/h is cooled from about 13° C. to about 1° C. in the heat exchanger 154 and recycled via the conduit 156. The heat exchanger 154 duty is about 135 kW.

Water from the conduit 156, 10000 kg/h, is split to provide 5500 kg/h to the conduit 128 and 4500 kg/h to the conduit 131. The water in the conduit 131 flows to the column 115 and is directed to the top of the packing 125. It flows downwards counter-current to about 3650 kg/h air from the air intake 116, via the conduit 112, the air filter 129 and the conduit 121 to the column 115 below the packing 125. In the packing, the air is cooled to between 1 and 2° C., such as about 1.2° C., before exiting the column 115 via the demister 113. The thus cooled and dehydrated air flows to the CO2 capture system via the conduit 124. About 19 kg/h water is condensed in this cooling process and exits the column 125 with the main water exit flow in the conduit 114.

The cooling cycle operated by the compressor 151 employs ammonia refrigerant. About 396 kg/h refrigerant is compressed from 2.8 bara to 20 bara in the compressor 151. The compressor duty is about 44 kW. The temperature of the ammonia at the compressor suction side is about 3° C. After compression the temperature is about 193° C., assuming compressor polytrophic efficiency of 85%. The warm refrigerant is directed to the absorption unit which is operating at desorption mode. This unit uses about 6 kW, cooling the refrigerant to about 170° C. The refrigerant is returned in the conduit 187. About 242 kg/h flows to the heater 104 where it is condensed and cooled to about 16° C. The heater duty is about 105 kW. The rest of the refrigerant, 156 kg/h, is directed to the cooler 177 via the conduit 175 and condensed. The cooler duty is about 65 kW. The combined refrigerant condensate flow, 396 kg/h, is throttled from about 20 bara or slightly less to about 3 bara in the valve 185. This reduces the temperature from about 16° C. to about −10° C. The fluid downstream of the valve is mainly liquid, with small amounts, such as about 10% gas. All of this fluid is directed to the heat exchanger 154 via the conduit 157. In the heat exchanger all the refrigerant is vaporized and heated to about 3° C. The pressure drops from 3.0 bara to about 2.8 bara because of friction within the heat exchanger. This vaporized refrigerant is recycled to the compressor 151 via the conduit 191, the conduit 180, the liquid knock-out drum 179 and the conduit 153, closing the refrigeration cycle.

Figure 6:
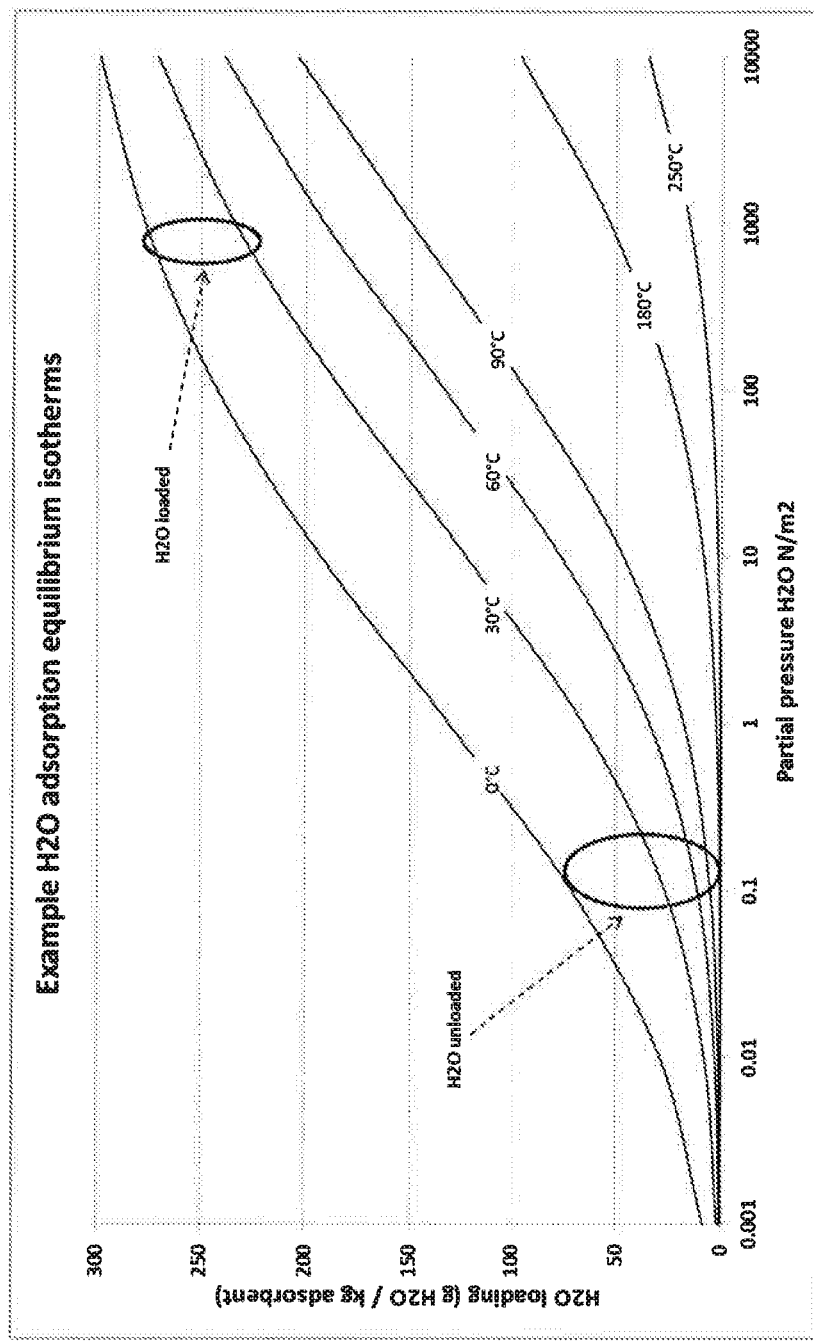
FIG. 6 shows example $H_2O$ adsorption equilibrium isotherms

The air flow in the conduit 124 is split in two, about 1080 kg/h to the unit 172, which is in $CO_2$ desorption mode, via the conduit 120, the fan 139 and the conduit 159. Unit 172 data is as follows:

$H_2O$ adsorption, unit 164: Feed air from the conduit 159, 1080 kg/h, has humidity is about 6 g/m$^3$. This corresponds to a total water flow of about 4.7 kg/h. The $H_2O$ partial pressure is about 700 N/m2. With reference to FIG. 6, the water adsorbent state moves from the area denoted "$H_2O$ unloaded" to the area denoted "$H_2O$ loaded". The loading capacity is about 250 g/kg. Therefore at least 18.8 adsorbent is needed if the duration of the $CO_2$ desorption process is one hour.

Figure 5:
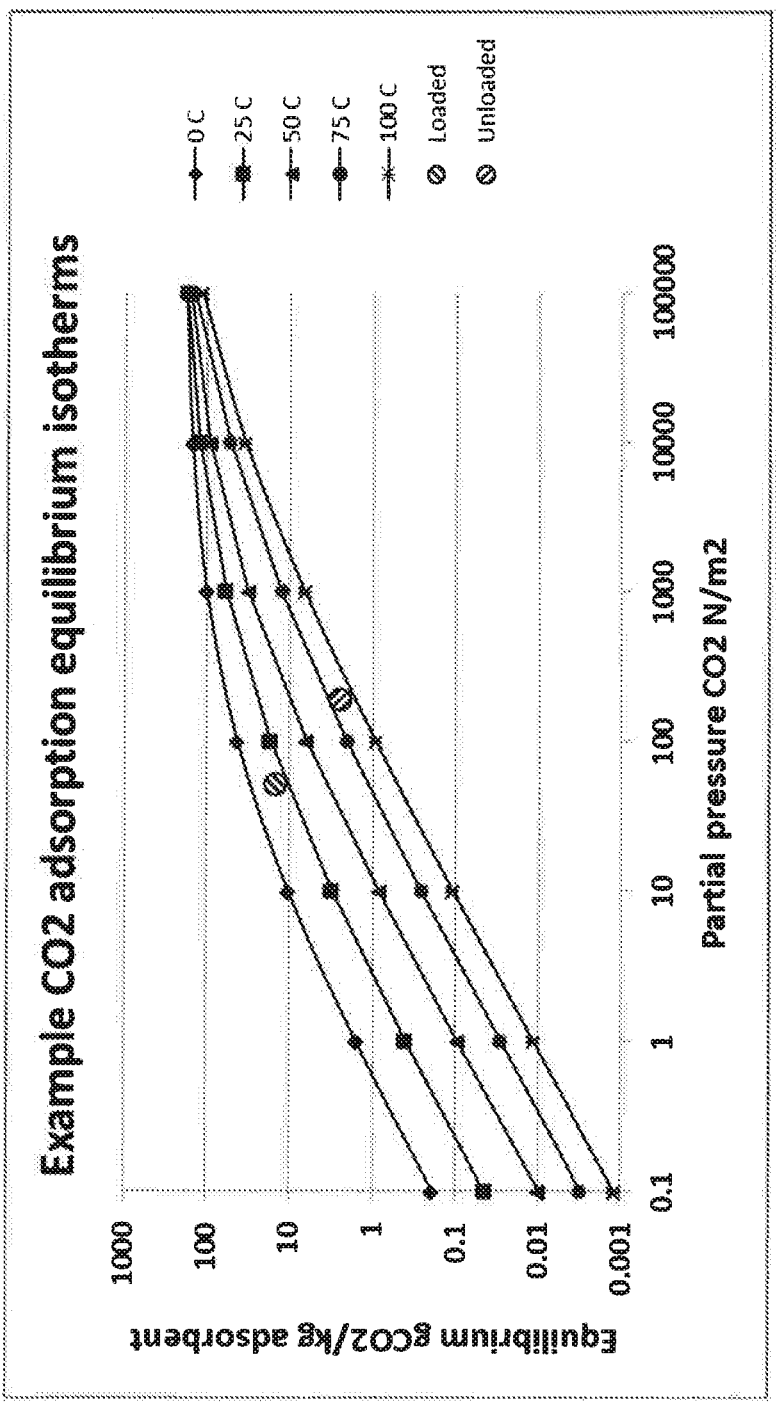
FIG. 5 shows example $CO_2$ adsorption equilibrium isotherms

$CO_2$ desorption, unit 171: 1080 kg/h feed air from the unit 171 contains 400 ppm $CO_2$ corresponding to about 0.65 kg/h. The $CO_2$ partial pressure is about 40 N/m$^2$. This air is heated to about 90° C. in the heaters 117 and 166. After desorption, downstream the unit 171, the $CO_2$ content is about 1900 ppm. The $CO_2$ partial pressure is about 190 N/m2 and the flow of $CO_2$ is about 3.1 kg/h. With reference to FIG. 5, the $CO_2$ adsorbent state moves from the point denoted "loaded" (upper left hand circle) to the point denoted "unloaded" (lower right hand circle). The loading capacity is about 15 g/kg adsorbent. The net amount of $CO_2$ desorbed is about 2.5 kg. Therefore at least 163 kg adsorbent is needed if the duration of the $CO_2$ desorption process is one hour.

$H_2O$ desorption, unit 167: warm, dry air from the unit 171 is used to desorb $H_2O$. At the end of the cycle, the temperature may be raised to high level such as 150° C. to complete the $H_2O$ desorption.

The rest of the air flow in the conduit 124, 2550 kg/h, and flows via the conduit 188 to a mixing point where mixing with about 1080 kg/h air from the conduit 103 takes place. The 2550 kg/h air in the conduit 188 is at about 1.2° C., contains 400 ppm $CO_2$ and the humidity is about 5 g/m$^3$. The 1080 kg/h air in the conduit 103 is at about 7° C., contains about 920 ppm $CO_2$ and the humidity is about 8 g/m$^3$. After mixing, the air in the conduits 119 and 142 is at about 2.8° C., the $CO_2$ concentration is about 550 ppm, corresponding to mass flow of about 3.0 kg/h. The $CO_2$ partial pressure is about 55 N/m$^2$. The humidity is about 6 g/m$^3$. This corresponds to water flow of about 17.7 kg/h. The partial pressure of water vapour is about 770 N/m$^2$. Unit 134 data is as follows:

$H_2O$ adsorption, adsorbent section 138: Feed air from the conduit 142, 3630 kg/h, has humidity about 6 g/m$^3$ and the water flow is 17.7 kg/h. The $H_2O$ partial pressure is about 700 N/m$^2$. With reference to FIG. 6, the water adsorbent state moves from the area denoted "$H_2O$ unloaded" to the area denoted "$H_2O$ loaded". The loading capacity is about 250 g/kg. Therefore at least 70.8 kg adsorbent is needed if the duration of the $CO_2$ desorption process is one hour.

$CO_2$ adsorption, unit 137: 3612 kg/h dehydrated feed air from the unit 138 contains 550 ppm $CO_2$ corresponding to about 3.0 kg/h. The $CO_2$ partial pressure is about 55 N/m$^2$. After adsorption, downstream the unit 137, the $CO_2$ content is about 90 ppm. The $CO_2$ partial pressure is about 9 N/m$^2$. With reference to FIG. 5, the $CO_2$ adsorbent state moves from the point denoted "unloaded" (lower right hand circle) to the point denoted "loaded" (upper left hand circle). The loading capacity is about 15 g/kg adsorbent. The net amount of $CO_2$ adsorbed is about 2.5 kg, which is the same as the amount desorbed in the unit 172, section 171. Similar to the unit 172 at least 163 kg adsorbent is needed if the duration of the $CO_2$ desorption process is one hour.

$H_2O$ desorption, unit 135: dehydrated air from the unit 137 is used to desorb $H_2O$. At the end of the cycle, the temperature may be raised to high level such as 150° C. by heating in the heater 136 to complete the $H_2O$ desorption.

Figure 4:
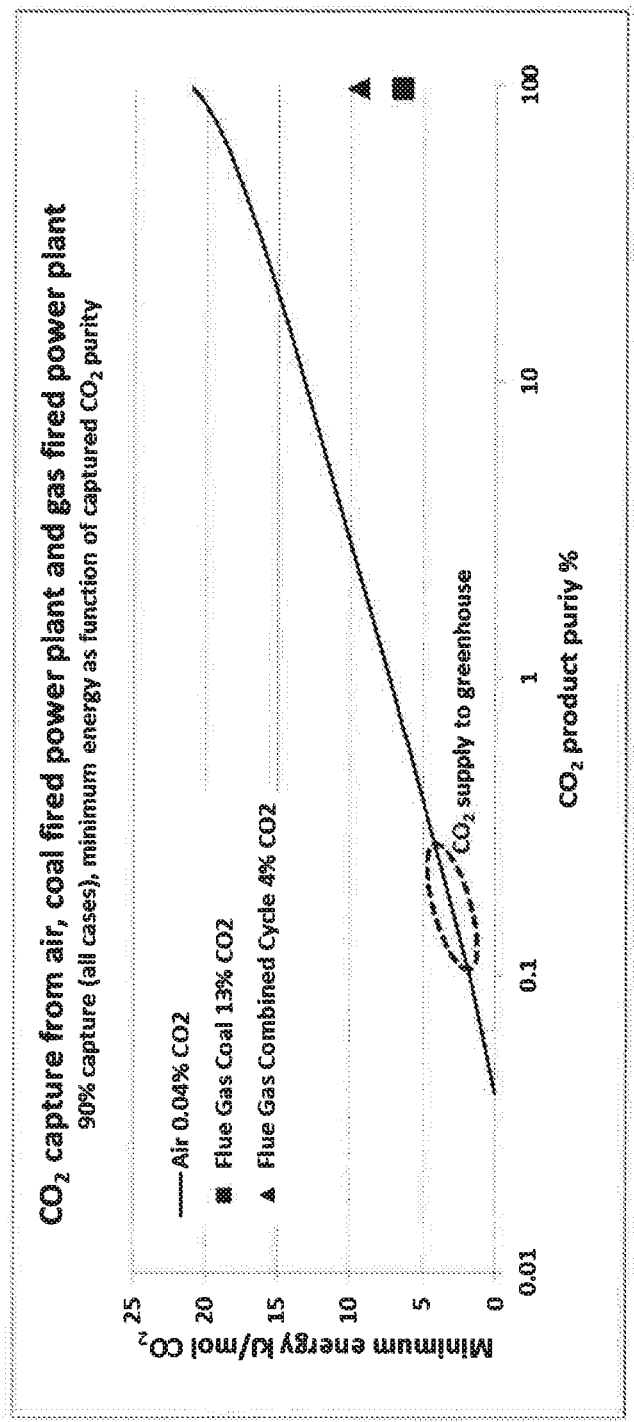
FIG. 4 shows a comparison of $CO_2$ capture efficiencies

People skilled in the art will notice that the specific energy required for $CO_2$ capture from air is heavily dependent on the concentration of $CO_2$ in the $CO_2$ rich product. FIG. 4 shows that the minimum specific energy is lower than for $CO_2$ capture from flue gas which is much richer in $CO_2$ than air, if the $CO_2$ from the flue gas is concentrated to a near 100% $CO_2$ product. Furthermore, inspection of FIG. 1 shows ample opportunities for improved heat integration, such as for example utilizing coldness from the cold, $CO_2$ depleted air exiting the unit 134.

People skilled in the art will also notice that adsorption of $H_2O$ releases significant amounts of heat, order of magnitude the same as the latent heat of water vapour condensation. This is an advantage in $CO_2$ desorption mode, such as the adsorbent 164, but a disadvantage in $CO_2$ adsorption mode, such an adsorber 138. With reference to FIG. 1, cooling coils may be used between the adsorber sections 137 and 138 in the unit 134, and between the sections 171 and 167 in the unit 172.

In addition to this, people skilled in the art will understand that instead of zeolite adsorption beds for $CO_2$ and $H_2O$, more efficient and less $H_2O$ sensitive $CO_2$ adsorption systems such as amine functionalized alumina may be used, simplifying the units 134 and 172, but introducing the disadvantage of potential amine degradation and production of toxic substances. Other sources of $CO_2$ may also be used such as bottled $CO_2$, dry ice, $CO_2$ from bioreactors or from a $CO_2$ pipeline.

The invention claimed is:

1. A method for controlling climate in a closed or semi closed space, the method comprising:
  a) drawing air from the closed or semi-closed space (100) and purifying this air by filtering in a filter (149),
  b) mixing the air produced from step a) with gas from a desorbing CO2 capture unit (158) supplied via a heat exchanger (117),
  c) cooling the air produced from step b) by contact and heat exchange with cooling water in a packed column (106),
  d) splitting the air produced from step c) in two and sending a first part to a CO2 adsorbing capture unit (134) and a second part to a fan (123),
  e) heating the said second part of the air from step d) in a heat exchanger (104) and recycling the heated air to said closed or semi-closed space (100),
  f) drawing air from the atmosphere via an air intake (116) and purifying this air by filtering in a filter (129), g) cooling the air produced from step f) by contact and heat exchange with cooling water in a packed column (115), h) splitting the air produced from step g) in two and sending the first part to a fan (139) and then to a desorbing $CO_2$ capture unit (172), i) mixing the second part of the air from step h) with said first part of the air from step d) and sending the mixture to said adsorbing $CO_2$ capture unit (134), j) compressing refrigerant in a compressor (151), k) piping the refrigerant produced from step j) to a heat exchanger (166) in said desorbing $CO_2$ capture unit (172) and heat exchanging with desorption air from said fan (139), l) piping the heat exchanged refrigerant from step k) to said heat exchanger (104) via conduits, m) expanding the refrigerant produced from step 1) in a valve (185), n) piping the expanded refrigerant from step m) to a heat exchanger (154) for heat exchange with cooling water from said packed columns (106) and (115) supplied via a pump (147), and o) piping water from said heat exchanger (154), to said packed columns (106) and (115).

2. A method according to claim 1, wherein said adsorbing $CO_2$ capture unit (134) and said desorbing $CO_2$ capture unit (172) are capable of adsorbing and desorbing $CO_2$ on an adsorbent and working work alternately in adsorbing and desorbing modes.

3. A method according to claim 2,
wherein said adsorbing $CO_2$ capture unit (134) is in adsorbing mode while desorbing $CO_2$ capture unit (172) is in desorbing mode and vice versa, wherein said adsorbing $CO_2$ capture unit (134) and said desorbing $CO_2$ capture unit (172) have the same functionalities for $CO_2$ adsorption and for $CO_2$ desorption namely:

a) wherein said $CO_2$ adsorption, as performed by said adsorbing $CO_2$ capture unit (134) or said desorbing $CO_2$ capture unit (172) when each is in its respective adsorbing mode, comprises driving adsorption air, supplied from the first part of the split stream from said packed column (106) and the second part of air from said packed column (115) to a gas purifying adsorption bed 138 or a gas purifying adsorption bed 167, respectively, then to a $CO_2$ adsorption bed 137 or a $CO_2$ adsorption bed 171, respectively, via a heat exchanger 136 or the heat exchanger 166, respectively, and a heat exchanger 189 or the heat exchanger 117, respectively, to a third adsorption bed 135 or a third adsorption bed 164, respectively, which is being regenerated by flowing gas, and b) wherein said $CO_2$ desorption, as performed by said adsorbing $CO_2$ capture unit (134) or said desorbing $CO_2$ capture unit (172) when each is working in its respective desorbing mode, comprises receiving desorption air from the first part of air from said packed column (115), driven by said fan (139), to a desorption air inlet of gas adsorption bed 135 or a gas adsorption bed 164, respectively, pre-heating this air by heat exchange in said heat exchanger 189 or said heat exchanger 117, respectively, with desorption air downstream of said gas purifying adsorption bed 138 or said gas purifying adsorption bed 167, respectively, further heating of the desorption air in the heat exchanger 136 or the heat exchanger 166, respectively, by heat exchange with compressed refrigerant from said compressor (151), heat transfer to said $CO_2$ adsorption bed 137 or said $CO_2$ adsorption bed 171, respectively, causing the heating of this bed and desorption of $CO_2$ into the desorption air, and desorption of contaminants in said gas purifying bed 138 or said gas purifying bed 167, respectively.

4. A method according to claim 3, wherein said gas purifying adsorption bed (138 or 167), said $CO_2$ adsorption bed (137 or 171), and said third adsorption bed (135 or 164) comprise zeolite adsorbent material.

5. A method according to claim 1, wherein the said closed or semi-closed space (100) is a greenhouse.

* * * * *